(12) United States Patent
Beimler et al.

(10) Patent No.: US 8,113,711 B2
(45) Date of Patent: *Feb. 14, 2012

(54) SHOULDER JOINT

(75) Inventors: Franz Beimler, Weiden (DE); Michael Kleber, Eslarn (DE); Marianne Köferl, Fichtelberg (DE); Joachim Trummer, Vilseck (DE); Dieter Wöhrl, Kemnath (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

This patent is subject to a terminal disclaimer.

(21) Appl. No.: 12/122,047

(22) Filed: May 16, 2008

(65) Prior Publication Data

US 2008/0294264 A1 Nov. 27, 2008

(30) Foreign Application Priority Data

May 23, 2007 (DE) .......................... 10 2007 023 848

(51) Int. Cl.
*B25J 18/04* (2006.01)
(52) U.S. Cl. ............................ 378/189; 378/190; 901/15
(58) Field of Classification Search .................. 378/204, 378/210, 189, 190, 196, 197, 198; 901/15, 901/28, 48
See application file for complete search history.

(56) References Cited

U.S. PATENT DOCUMENTS

| | | | |
|---|---|---|---|
| 4,024,403 A | 5/1977 | Bernstein et al. | |
| 4,065,001 A | 12/1977 | Ohnaka | |
| 4,431,366 A | 2/1984 | Inaba et al. | |
| 4,894,855 A | 1/1990 | Kresse | |
| 4,929,147 A * | 5/1990 | Jenkner | 414/802 |
| 2003/0192758 A1 | 10/2003 | Murata | |
| 2005/0115352 A1 | 6/2005 | Tanaka | |
| 2006/0145495 A1 | 7/2006 | Fang et al. | |
| 2008/0292061 A1 | 11/2008 | Beimler et al. | |
| 2008/0294264 A1 | 11/2008 | Beimler et al. | |

FOREIGN PATENT DOCUMENTS

| | | |
|---|---|---|
| CN | 2258032 Y | 7/1997 |
| CN | 2591638 Y | 12/2003 |
| DE | 26 28 734 | 12/1977 |
| DE | 26 28 734 A1 | 12/1977 |
| DE | 103 19 933 | 12/2004 |
| DE | 103 19 933 A1 | 12/2004 |
| DE | 10 2004 004 238 A1 | 8/2005 |

(Continued)

OTHER PUBLICATIONS

German Office Action dated Jun. 30, 2010 for DE 10 2007 023 848.9-15 with English translation.
German Office Action dated Jun. 29, 2010 for German Patent Application No. DE 10 2007 023 847.0-15 with English translation.

(Continued)

*Primary Examiner* — Chih-Cheng G Kao
(74) *Attorney, Agent, or Firm* — Lempia Summerfield Katz LLC

(57) ABSTRACT

A shoulder joint is provided. The shoulder joint includes a main support, a fold-out arm, first and second carriages arranged on the main support, and a first coupling that is operable to couple the first and second carriages together. The fold-out arm is attached by a pin to the second carriage, and the first carriage is connected to the fold-out arm in such a way that when the first and second carriages are operable to move towards each other, the fold-out arm is folded out by pivoting around the pin. The first coupling is operable to couple the first and second carriages together when the fold-out arm is folded out, and the first and second carriages are operable to move jointly in at least one direction when coupled together.

26 Claims, 15 Drawing Sheets

FOREIGN PATENT DOCUMENTS

| | | |
|---|---|---|
| DE | 10 2004 004 238 | 1/2007 |
| FR | 2 809 048 A1 | 11/2001 |
| WO | WO 89/11435 | 11/1989 |
| WO | WO 89/11435 A1 | 11/1989 |

OTHER PUBLICATIONS

Chinese Office Action dated Nov. 12, 2010 for Chinese Patent Application No. 200810191174.5 with English translation.

* cited by examiner

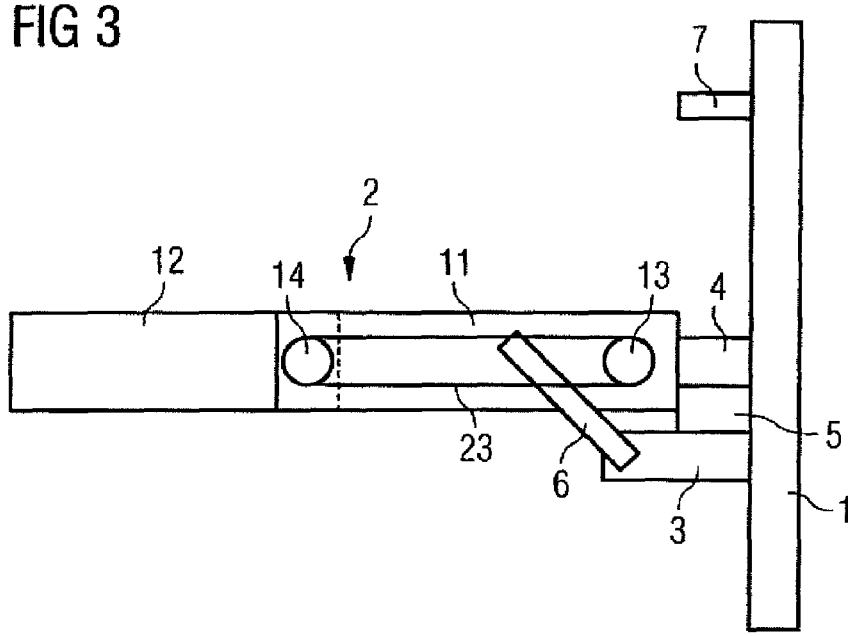
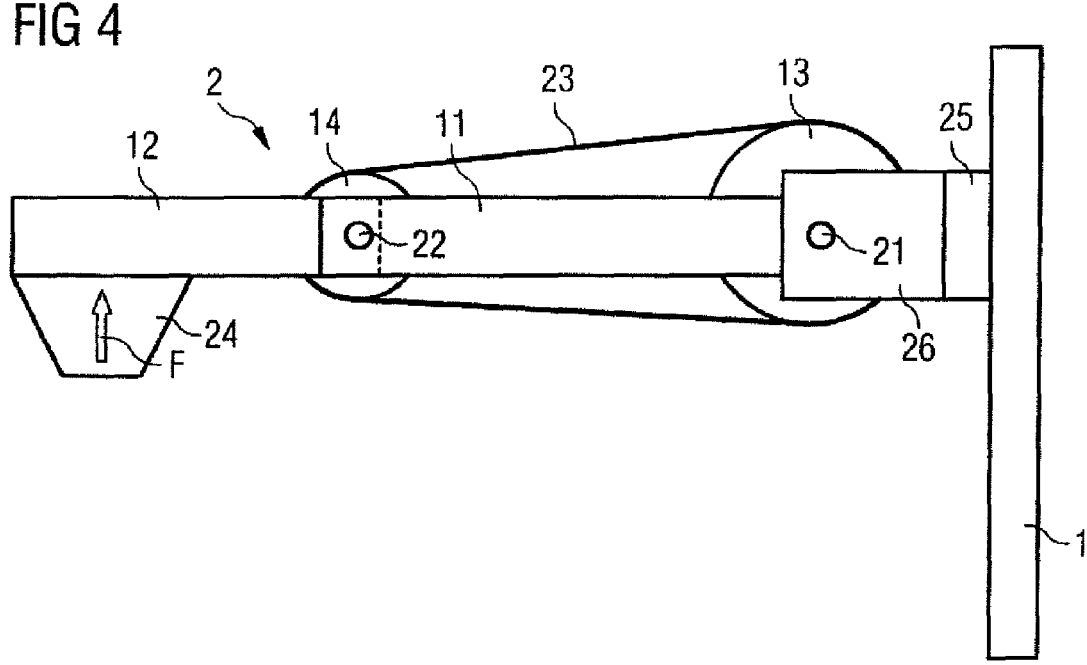

SHOULDER JOINT

The present patent document claims the benefit of the filing date of DE 10 2007 023 848.9 filed May 23, 2007, which is hereby incorporated by reference.

BACKGROUND

The present embodiments relate to a shoulder joint

Medical equipment is typically used for all patients, irrespective of their particular physical characteristics. The medical equipment is used to carry out different examinations using one piece of equipment. The medical equipment is multipurpose. The medical equipment is designed to meet these requirements. The medical equipment may include, for example, an X-ray machine or fluoroscopy machine used to obtain photographs. A device is used for pushing away or compressing the fatty tissue of the patient under examination according to the examination or physical characteristics of the patient. An extension or arm is normally used, which is adapted to suit the equipment as required. The extension may move perpendicular to the surface on which the patient lies, so that the extension can be vertically adjusted, to suit the individual physical characteristics of the patient (e.g. obesity). To adjust the extension vertically, the extension is mounted on a movable carriage.

SUMMARY AND DESCRIPTION

The present embodiments may obviate one or more of the drawbacks or limitations inherent in the related art. For example, in one embodiment, a shoulder joint meets specific requirements and may be adapted depending on a particular application.

In one embodiment, a shoulder joint includes a main support, a fold-out arm, first and second carriages arranged on the main support, and a first coupling that couples the two carriages. The arm is attached to the second carriage by a pin or is rotatable around the pin. The first carriage is connected to the arm, such that the arm, when the two carriages move towards each other or the distance between the carriages is reduced, is folded out by being pivoted around the pin. The first coupling is for coupling the two carriages with the arm folded out (e.g. the first coupling is embodied such that, with a minimal distance between the two carriages at which the folding-out process is ended, a coupling occurs or can be undertaken). The coupled-together carriages may be moved jointly in at least one direction.

In one embodiment, a device (e.g. a x-ray device) may include an arm or extension movable for adjustments that may be folded in or folded out. The folding out or folding in of the arm by relative movement of the two carriages is, for example, effected by a push rod that connects the first carriage to the arm. The movement of the arm (e.g., folding out or folding in) is effected by the relative movement of the two carriages. The relative movement of the two carriages, for hinging out the arm, is realized, for example, by the second carriage being fixed at a position while the arm is not completely folded out and the first carriage is moved towards the second carriage for the purpose of folding out the arm. A second coupling for fixing the position of the second carriage on the main support is provided. The second coupling couples the second carriage from the fixed position, when the arm is folded out, with the arm folded out. The carriages that are coupled may be moved or the position of the arm is able to be adapted.

In one embodiment, the first coupling may beat least one electromagnet. After the folding out of the arm, a voltage is applied to the at least one electromagnet, such that the two carriages are coupled together. The second coupling may be a permanent magnet. The permanent magnet may be embodied for an uncoupling of the second carriage from the fixed position when the arm is folded out by application of a voltage to the permanent magnet.

In one embodiment, the fold-out arm includes an upper arm and a lower arm. The upper arm is attached, by a pin, to the second carriage and the lower arm is fitted to allow the lower arm to rotate on a spindle at an end of the upper arm. The folding out of the arm may be linked to a relative movement of the upper arm and lower arm (e.g., similar to the bending and stretching with a human arm). The relative movement of upper arm and lower arm may be realized by a first wheel on the pin and a second wheel on the spindle. The two wheels may be mechanically linked so that a rotation of the upper arm around the pin (e.g., relative to the first wheel which is fixed to the pin) leads to a rotation of the second wheel and thereby of the lower arm relative to the upper arm. The wheels may be belt wheels or sprockets. The mechanical linkage may be a belt or a chain running around the wheels. When the arm is rotated around the pin, a relative movement of upper and lower arm is automatically effected (e.g., bending or stretching). For example, a single drive may be used to cause the two different types of movement e.g., (folding out the arm and bending/stretching).

The wheels may be locked. Locking the wheels locks the relative position of upper and lower arm with the arm folded out. The wheels and the mechanical linkage being such that for defined applications with exertion of pressure on the arm (usually the lower arm) the amount of the resulting torque around the spindle is minimized. To achieve this self-locking a form other than the round form can be selected for the wheels, e.g. an elliptical form of the second wheel. The advantage of this form of wheel is that it harmonizes two requirements, namely the most complete possible ability to fold the arm in and out and the ratio of the diameter of the wheels required for self-locking.

In one embodiment, a force exerted on the arm (generally the lower arm) is estimated. A spring looped into the belt or the chain may be used to estimate the force exerted on the arm. Alternately, a force measurement from the change in length of a push rod for folding out the arm is possible or the change in angle of the upper arm around its pin is measured.

A method for folding out an arm, which is included in a shoulder joint, is provided. The method includes moving the two carriages towards each other in order to effect a folding out of the arm. After the arm is folded out, the two carriages are coupled together so that they may be moved in at least one direction. The second carriage may be initially coupled firmly to the main support and may be uncoupled from its fixed position after the folding out of the arm.

In one embodiment, the arm may be embodied from an upper arm and a lower arm and may be designed for a bending or stretching movement, with the relative movement of the upper and lower arm being such that the bending and stretching movement is automatically realized via wheels and a mechanical relationship.

BRIEF DESCRIPTION OF THE DRAWINGS

FIG. 3 illustrates one embodiment of a folded-out shoulder joint,

FIG. 4 illustrates one embodiment of an upper and lower arm and two arm parts coupled by toothed wheels.

DETAILED DESCRIPTION

Figure 1:
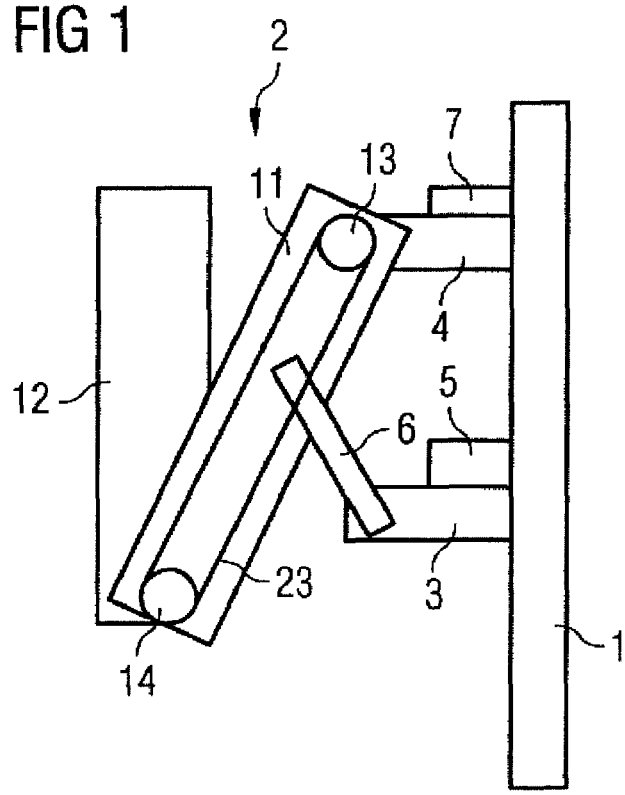
FIG. 1 illustrates one embodiment of a folded-in shoulder joint

FIG. 1 shows a shoulder joint. The shoulder joint may be used with an x-ray device or a combined x-ray-fluoro device, for example. The shoulder joint may include a main support or housing 1, an arm 2, a first carriage 3, and a second carriage 4. The first or lower carriage 3 and the second or upper carriage 4 may be arranged on the main support or housing 1. FIG. 1 shows the state when the arm 2 is folded in. The arm 2 includes an upper arm 11 and a lower arm 12. A first coupling 5 and a second coupling 7 may be magnets. In the folded-in state, the second coupling element 7 holds the upper or second carriage 4 in position. A push rod 6, which connects the first or lower carriage 3 to the upper arm 11, is used for folding out the arm. The arm 2 may be rotated around a first wheel 13, the center of which coincides with the pin 21 (shown in FIG. 4). A second wheel 14 is attached to a spindle 22 (shown in FIG. 4) as is the lower arm 12. The two wheels 13, 14 are coupled by a chain or a belt 23. For folding out, the lower carriage 3 is transported upwards in a guide rail in the direction of the second carriage 4 by a drive. The transportation of the lower carriage 3 causes the push rod 6 to exert a force on the upper arm 11, which unfolds the upper arm 11 into the horizontal position. As the upper arm 11 unfolds, the upper arm 11 rotates around the first wheel 13, which causes the chain 23 connecting the two wheels to move on the second wheel and unfold the lower arm 12 relative to the upper arm 11. The result of the upwards movement of the lower carriage 3 is the folding out of the upper arm 11 into the horizontal position and the simultaneous stretching of the lower arm 12.

Figure 2:
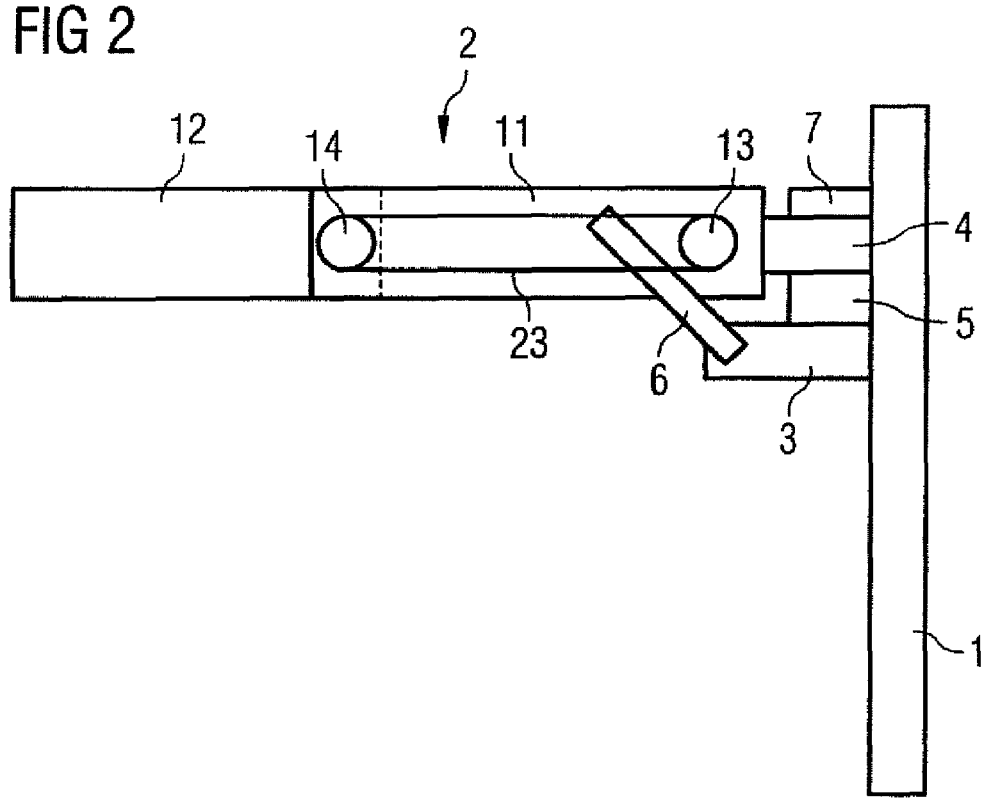
FIG. 2 illustrates one embodiment of a folded-out shoulder joint.

FIG. 2 shows the shoulder joint in the folded-out state. The upper carriage 4 is uncoupled from the original position, for example, by a voltage being applied to the second coupling 7, which may be a permanent magnet, and the uncoupling being effected in this way. Simultaneously the two carriages 3, 4 are coupled to one another by the first coupling 5 (e.g. an electromagnet) so that then the coupled carriages 3, 4 are able to be moved along the guide rail and the height of the arm 2 is able to be adjusted. The vertical movement of the arm 2 is shown in FIG. 3 where the arm 2 with the two carriages 3, 4 has been moved downwards, onto a patient, for example.

As shown in FIGS. 1-3, the function of the shoulder joint does not depend on a specific orientation of the main support 1 in space. In a medical application, the shoulder joint may be used for compression of fatty tissue regardless of the position of the patient, which can assume any angle between 0 and 90 degrees to the horizontal. Within the framework of the exemplary embodiment a horizontal position of the patient is assumed for the sake of simplicity.

FIG. 4 shows the shoulder joint depicted in FIG. 1 to 3. In FIG. 4, the shoulder joint includes the pin 21, the spindle 22, and the two wheels 13, 14. A tube 24 may be used for medical applications. In FIG. 4, the shoulder joint includes only one carriage element, which is a linear guide carriage 25 and a carriage structure 26 that includes the pin 21. The wheels 13, 14 involved are toothed wheels or belt wheels, which are connected by a chain or a belt 23. The first toothed wheel 13 is mounted firmly on the pin 21 of the carriage structure 26, so that the arm 2 can rotate around the toothed wheel 13 and simultaneously around the pin 21. The upper arm 11 may rotate on the pin 21. The second toothed wheel 14, like the lower arm 12, is fixed to the spindle 22, so that lower arm 12 and toothed wheel 14 rotate together. Arranged at the end of the arm 2, for example, is a tube 24 for medical applications. The tube 24 may, for example, be a compression tube, on which a force acts.

Figure 5:
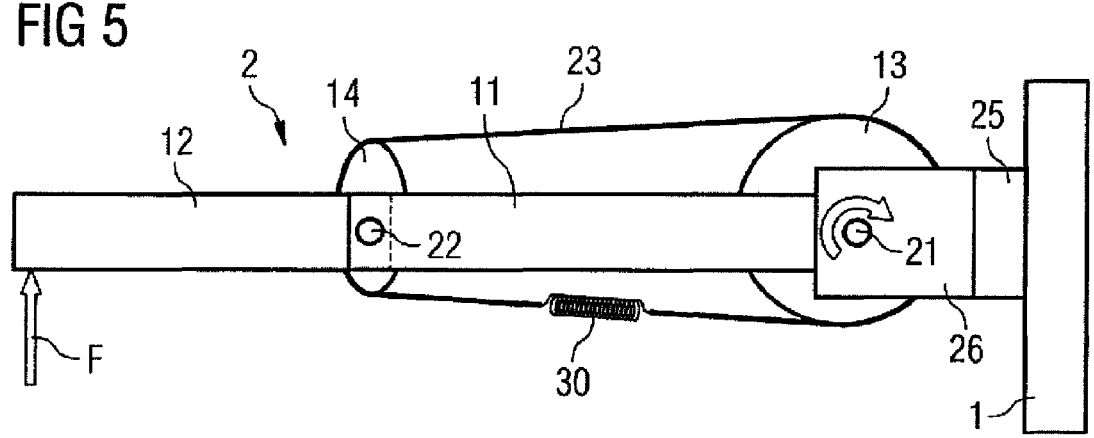
FIG. 5 illustrates one embodiment of a shoulder joint with a spring is incorporated into the toothed wheel chain for the purposes of flexibility of the arm.
Figure 6:
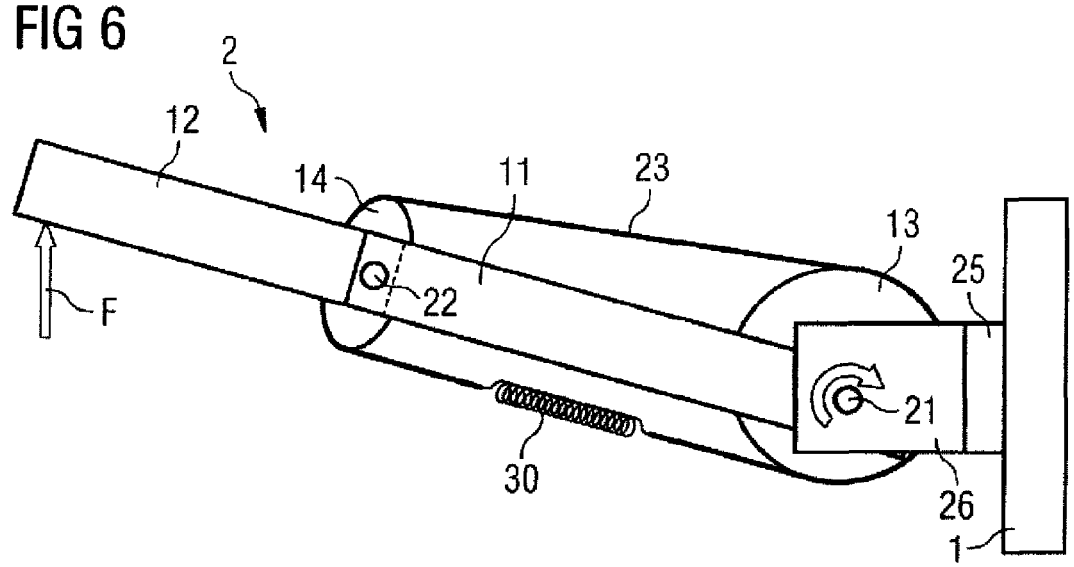
FIG. 6 illustrates one embodiment of an arm with a built-in spring.

In one embodiment, as shown in FIGS. 5 and 6, the stretched-out arm (upper and lower arm) may rotate around the rotation point of the pin 21 of the upper carriage, under the influence of a force F. For example, this can be sensible for an arm 2 pressing together the tissue of the patient, since an arm 2 that rotates around the pin 21 may be more comfortable and less constricting for the patient. For example, breathing movements causing the force F may be compensated for by an arm 2 on which the force F yields. A spring 30, which with its ability to extend, may be used to achieve the yielding and/or the springing of the arm when the force is applied.

FIG. 5 shows how the straightened arm (upper and lower arm) is designed to move about the pivot point of the pin by introducing a spring element 30 in the lower stretch of the chain 23. Under the influence of a force F, the straightened arm 2 (upper and lower arm) moves around a rotation point of the pin of the upper carriage by an angle which depends on the size of the force F exerted (FIG. 6). If the force F is exerted on the lower arm 12 during compression, for example, tensile stress arises in the lower belt of the chain 23 drive. The arm 2 is forced upwards until the tensile stress is large enough to compensate for the torque caused in relation to the pin 21 by the force F. The breathing movement is compensated for by incorporating a spring.

Figure 7:
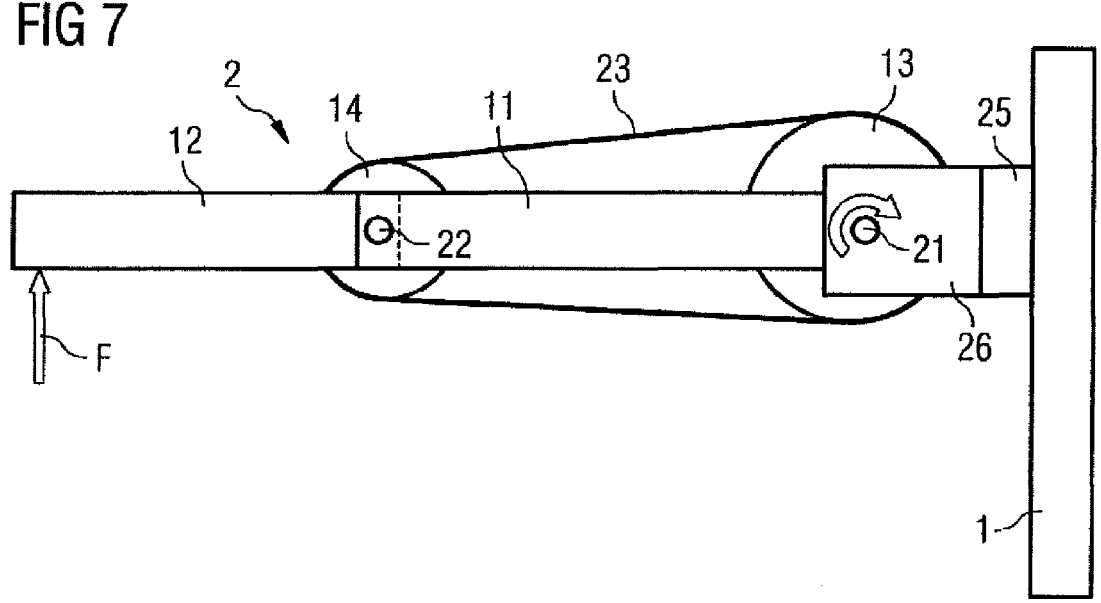
FIG. 7 illustrates one embodiment of a shoulder joint with a rigid arm, FIG. 8 a schematic sketch of the arm for a model computation.

FIG. 7 shows an arm 2 without a spring 30 that remains rigid. For the application in which the construction is not to spring away upwards the spring unit in the lower belt is dispensed with. The folded-out arm construction remains rigid (FIG. 7).

Figure 8:
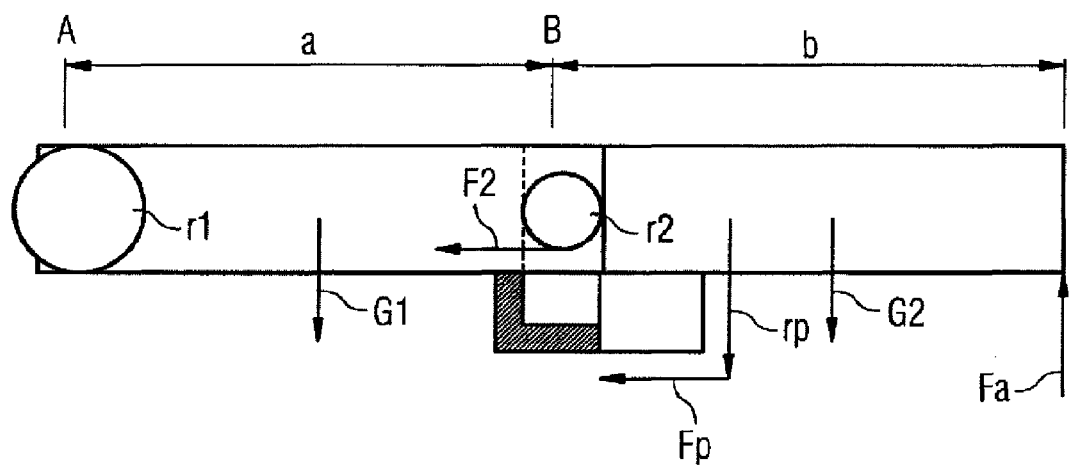

When the arm 2 is to yield to the force F (e.g., FIG. 6), the arm 2 remains rigid, for example, no kinking of the lower arm 12 in relation to the upper arm 11 or no bending of the arm 2 occurs. The arm 2 folds back around the fixed axis 21. The folding back is achieved by locking the upper arm 11 and lower arm 12 in relation to each other. The locking of the upper arm 11 and lower arm 12 may be done, for example, by an additional locking device, which operates when the arm 2 is fully stretched. FIG. 8 illustrates another way to lock the upper arm 11 and lower arm 12. When a force F is acting and the arm 2 is yielding, as shown for example in FIG. 6, a torque is acting in relation to the point, which is given by spindle 22, which is attempting to fold the lower arm 12 upwards and a force is acting through the expanded spring 30 through which a torque is effected in the other direction in relation to the spindle 22. By selecting the relative dimensions of the components used, the two torques may be set to be substantially equal in magnitude so that there is no bending of the arm 2 when yielding to the force F. The equalizing of the two torques may involve a self-locking. FIG. 8 illustrates the self-locking and a type of example calculation. FIG. 8 shows the arm 2 with forces acting on it. In accordance with the example calculation below, the two torques vanish simultaneously around the pin 21 and the spindle 22, so that no bending of the arm 2 results. In order to achieve a certain safety margin against bending, the equation includes a 10 N contact force for the lower arm pressing against the upper arm.

Given a certain transmission ratio (see example calculation) between the two sprockets and a certain torque arm from application of force (point of the patient compression) to the spindle at the front end of the upper arm, then the two arms do not perform any movement relative to each other and the lower arm 12 does not buckle. Therefore, an additional locking element is not required.

The example calculation for FIG. 8 for the transmission ratio of the sprockets at which the arms do not buckle is based on the following configuration:

r1: radius of sprocket 1
r2: radius of sprocket 2
G1: own weight of upper arm=20 N
G2: own weight of lower arm=10 N
Fa: contact force=150 N
rp: distance between center of sprocket 2 and the point at which the contact force is applied=30 mm
Fp: contact force of lower arm pressing on upper arm=10 N
a: length of upperarm=430 mm
b: Length of lower arm=430 mm The ratio of the two sprockets is calculated using the requirement that the resultant torques about pin 21 and spindle 22 vanish.

$\Sigma M_A=0=a/2*G1+r1*F2+G2*(a+b/2)-Fa(a+b)+rp*Fp=215$ mm*20 N+r1*F2+10 N*645 mm−150 N*860 mm+10 N*30 mm; and therefore, F2=117950 Nmm/r1

$\Sigma M_B=0=b/2*G2+r2*F2-b*Fa-rp*Fp=215$ mm*10 N+r2* F2−430 mm*150 N−10 N*30 mm; and therefore, F2=62650 Nmm/r2. Accordingly, r1/r2=117950 Nmm/62650 Nmm=1.88.

Figure 9:
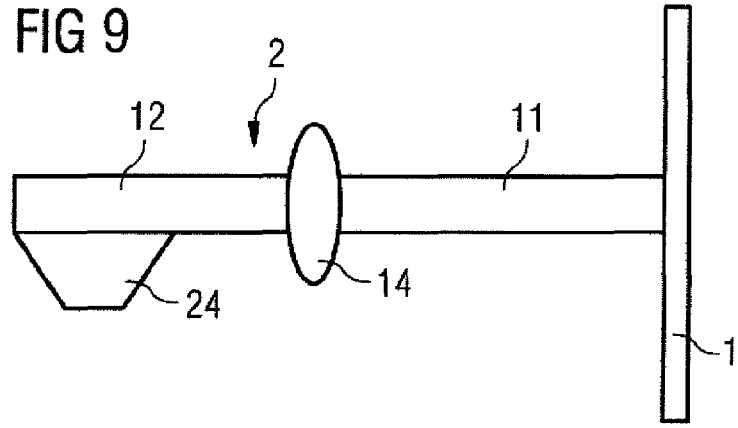
FIG. 9 illustrates one embodiment of an arm with an elliptical toothed wheel.
Figure 10:
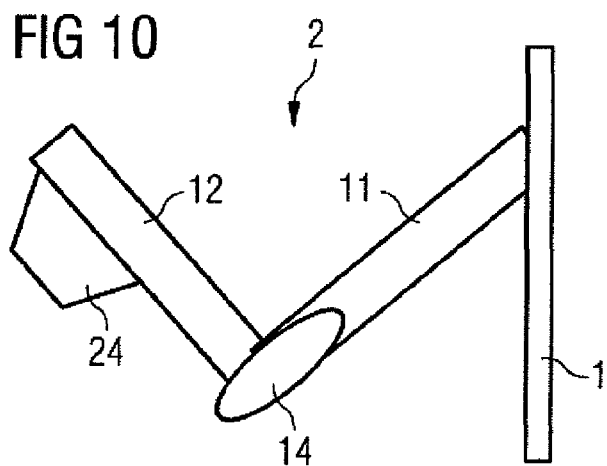
FIG. 10 illustrates one embodiment of an arm with an elliptical toothed wheel with an angle of 90° between an upper arm and an lower arm.
Figure 11:
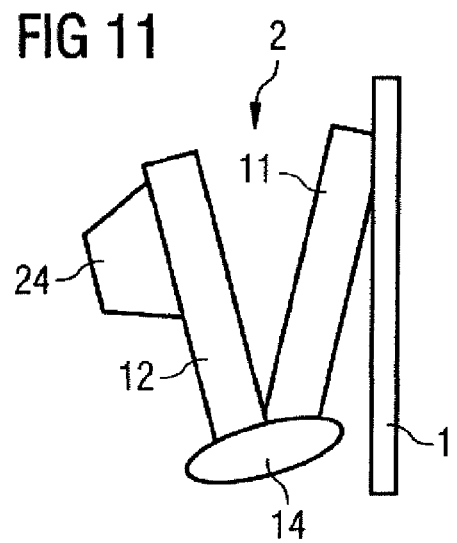
FIG. 11 illustrates one embodiment of a folded-in arm with an elliptical toothed wheel.

The second wheel 14 may be an elliptical wheel. The elliptical wheel may be used to obtain the corresponding dimensions of the joint. The elliptical wheel is shown in FIGS. 9, 10 and 11 in the folded-out state, at an angle between upper and lower arm of 90°, and completely folded in, respectively.

Figure 12:
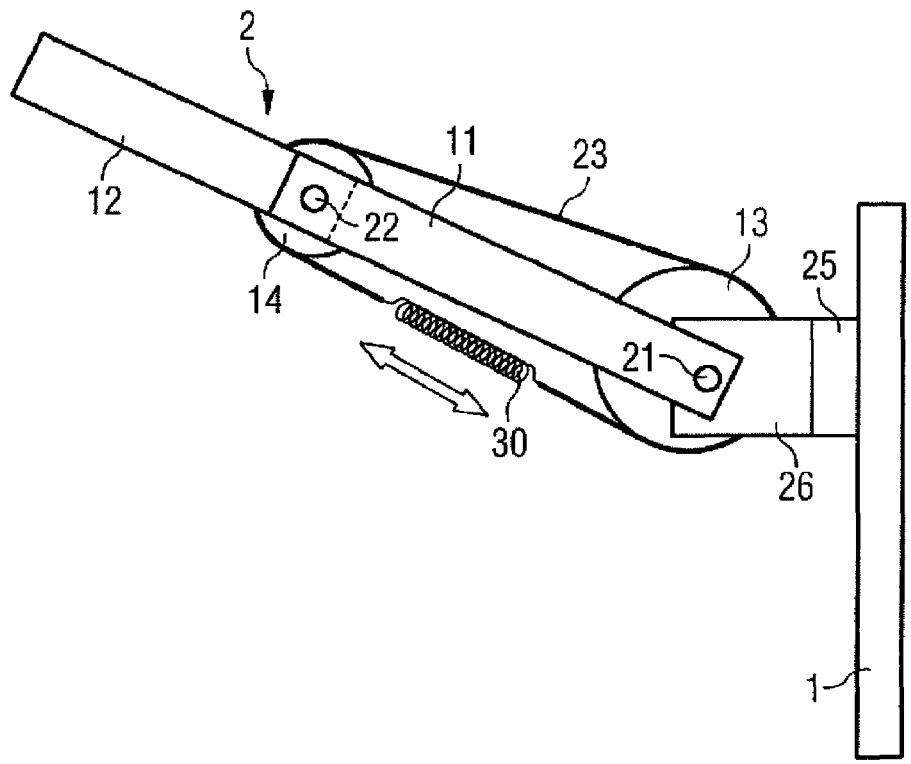
FIG. 12 illustrates a force measurement in an arm by springs.
Figure 13:
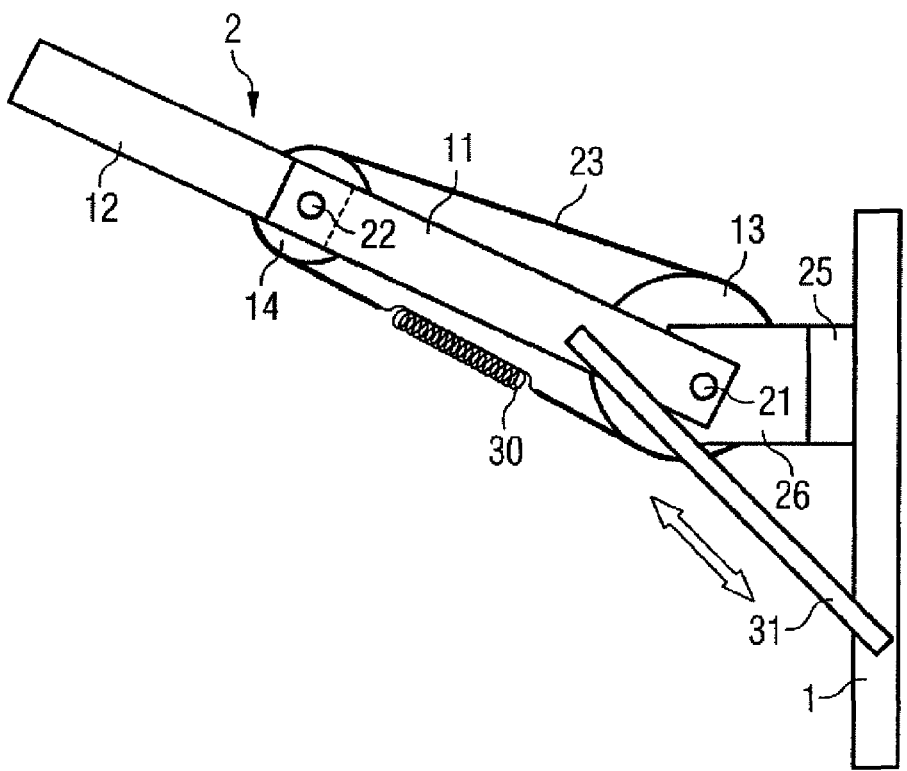
FIG. 13 illustrates a force measurement in the arm using the change in length of a push rod, FIG. 14 arm in the de-energized state before application of force (patient recovery), FIG. 15 arm in the de-energized state before force is applied (patient recovery)

The force acting on the arm may be measured. Measuring the force acting on the arm may be measured, for example, via the change of length of the spring (FIG. 12) or by a change of length of the push rod 31 (FIG. 13). As is shown in FIGS. 12 and 13, the forces arising, for example, in the case of application in a fluoro x-ray device on the compression tube, may be measured via the change in length of the spring in the lower area of the chain or belt drive, but also through a linear potentiometer attached to the rods used for folding out.

Figure 14:
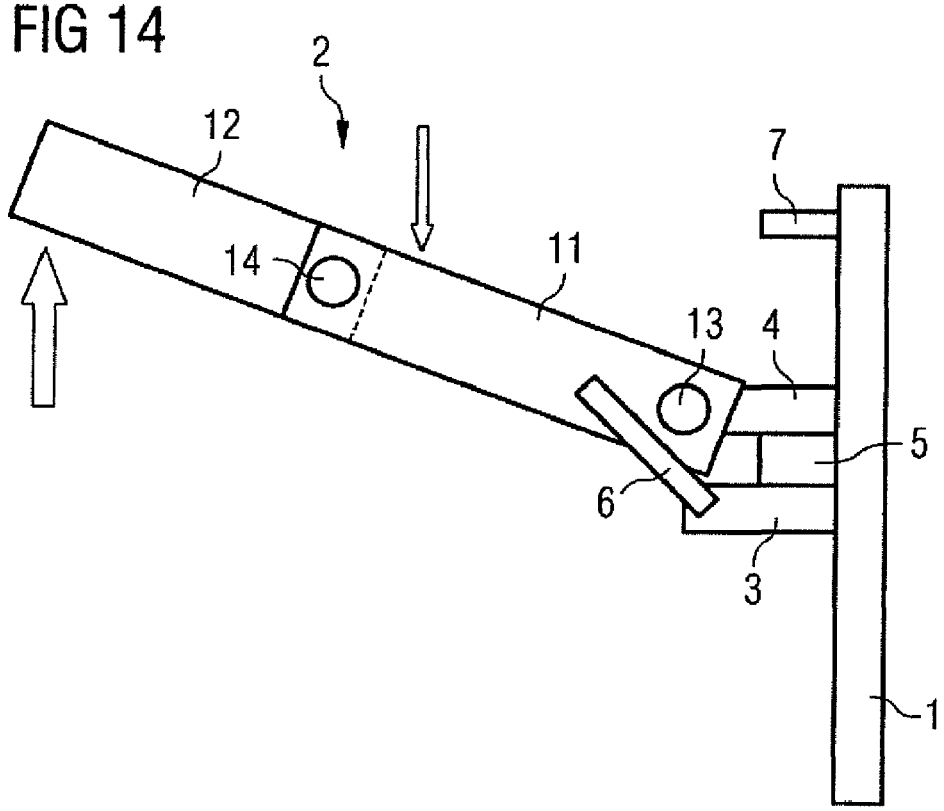
Figure 15:
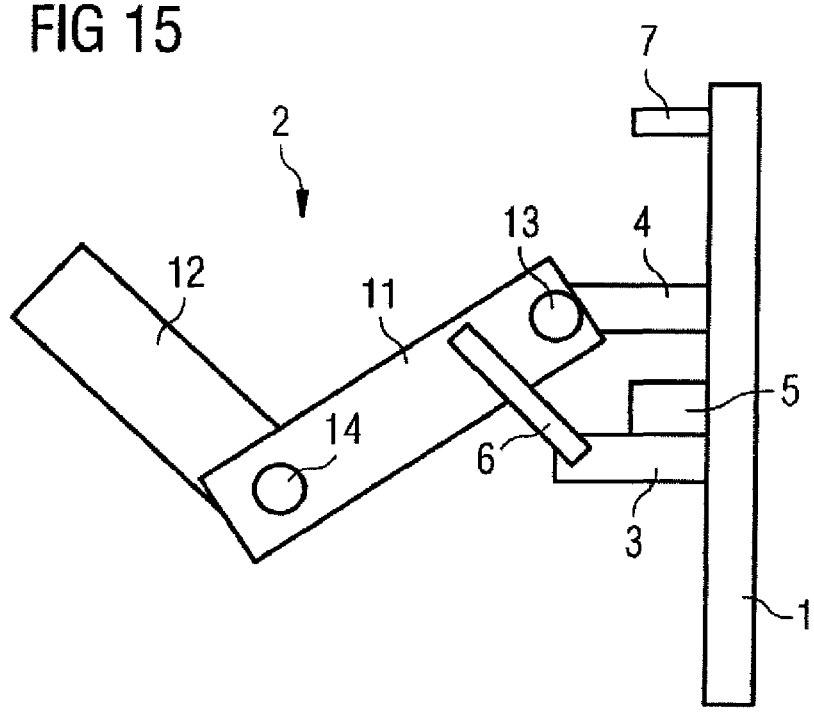
Figure 16:
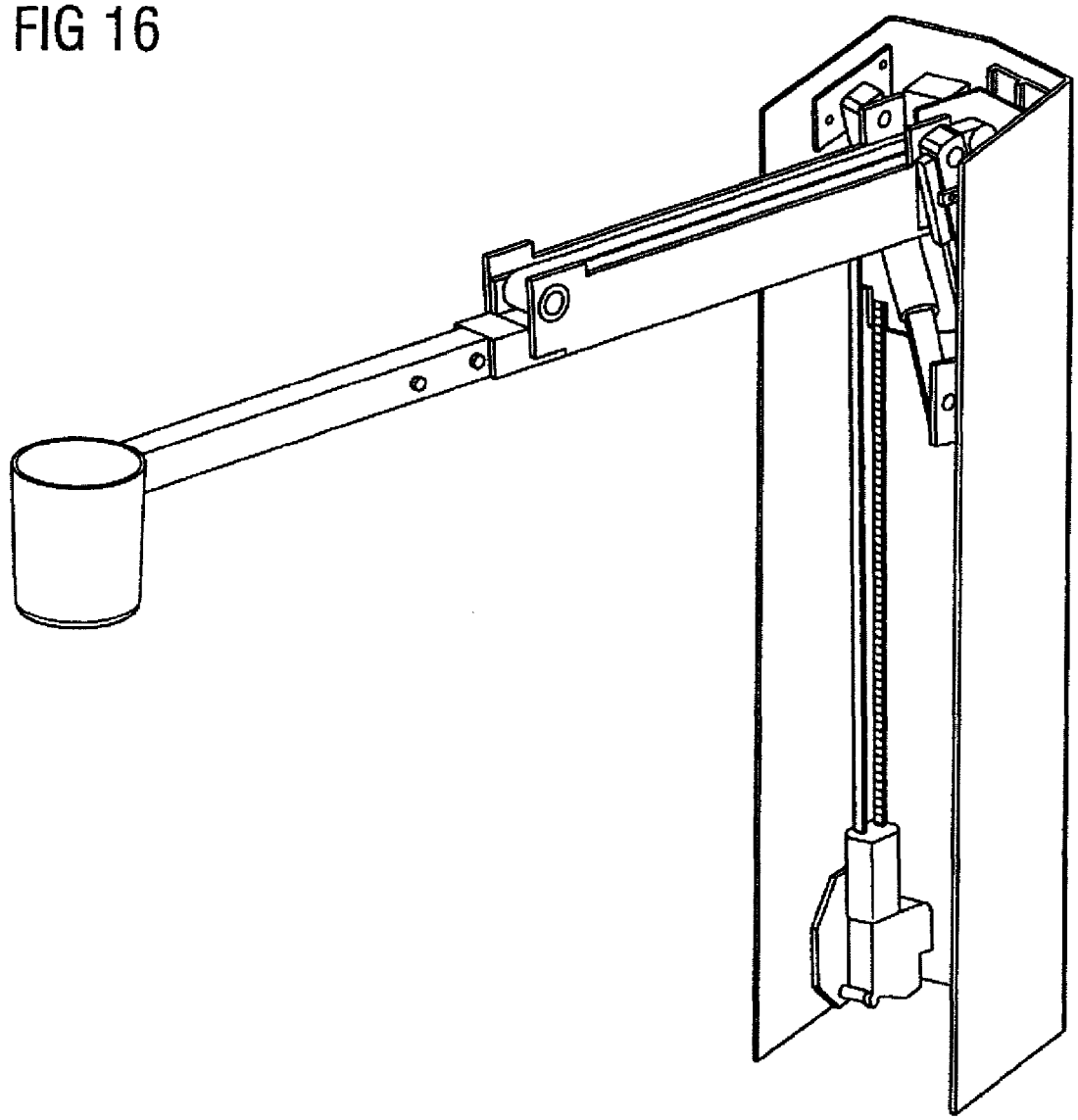
FIG. 16 illustrates one embodiment of a shoulder joint.

FIG. 14 and FIG. 15 show embodiments of the shoulder joint in medical applications.

The self-locking as illustrated in FIG. 5 and FIG. 6 has been explained with reference to FIG. 8. The self-locking results from a compensation of the force F pushing the arm 2 upwards from below (compression force) by an opposing force (or an opposing torque), which is or are created by the tensile stress of the spring 30. Since the spring may be stretched to a limited extent, the compression force F can only be compensated for up to a maximum force associated with the spring characteristics. For greater forces, the belt or the chain 23 connecting the wheels 13, 14 is practically rigid. The lower arm 12 may be pressed upwards by the compression force F, with the belt or chain 23 moving from the second wheel 14 onto the first wheel 13. For example, the folding-out mechanism described with reference to FIG. 1 to FIG. 3 may be used in reverse. Instead of force transfer from lower carriage to upper arm and through movement onto lower arm, force is transferred to upper arm, then through movement onto lower arm and from lower arm to lower carriage.

This capability of the arm to yield to larger forces provides safety with medical applications.

A simple patient recovery with applied compression is possible should an emergency occur.

In the normal state, with the device under tension, by operation of the opposing force F, for example, pressure on the elbow joint, the force circumstances leading to self-locking and the retaining force of the lower coupling magnet 5 may be overcome as explained above and the arm folds in (FIG. 15).

Even in the de-energized state, account is taken of simple patient recovery. The lower coupling magnet (electromagnet), which holds the two carriages together during the compression, is not magnetic in the de-energized state. With lower compression forces, the entire arm folds in if the power fails (FIG. 15) and guarantees a trouble-free patient recovery. With larger compression forces, an opposing force may be applied to the upper arm to compensate for the self-locking forces, which resist a folding-in of the arm.

Figure 17:
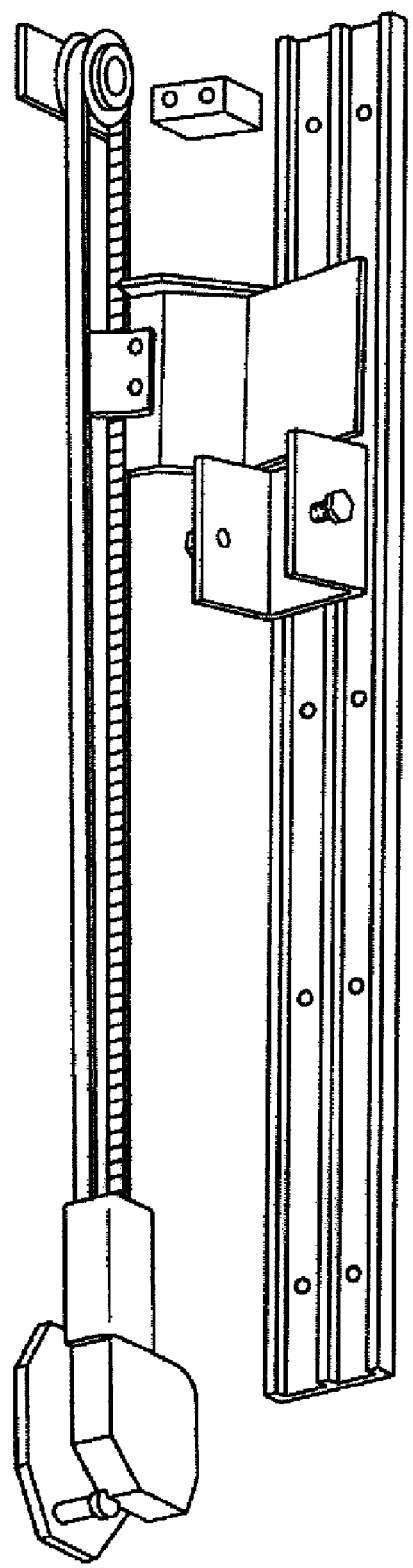
FIG. 17 illustrates a conversion of a rotational movement of the motor into a translational movement.

FIG. 16 to FIG. 21 show one embodiment of the shoulder joint for a medical application. The shoulder joint, shown in FIG. 16, may include a motor. The motor is used to transmit the rotational movements into a translational movement (FIG. 17).

The rotational movement of the motor is converted with a toothed belt into a translational movement, with the lower carriage or, when the arm is folded out, the coupled carriages being driven. The lower carriage of the compression unit is firmly connected to the toothed belt and runs in a guide rail.

Figure 18:
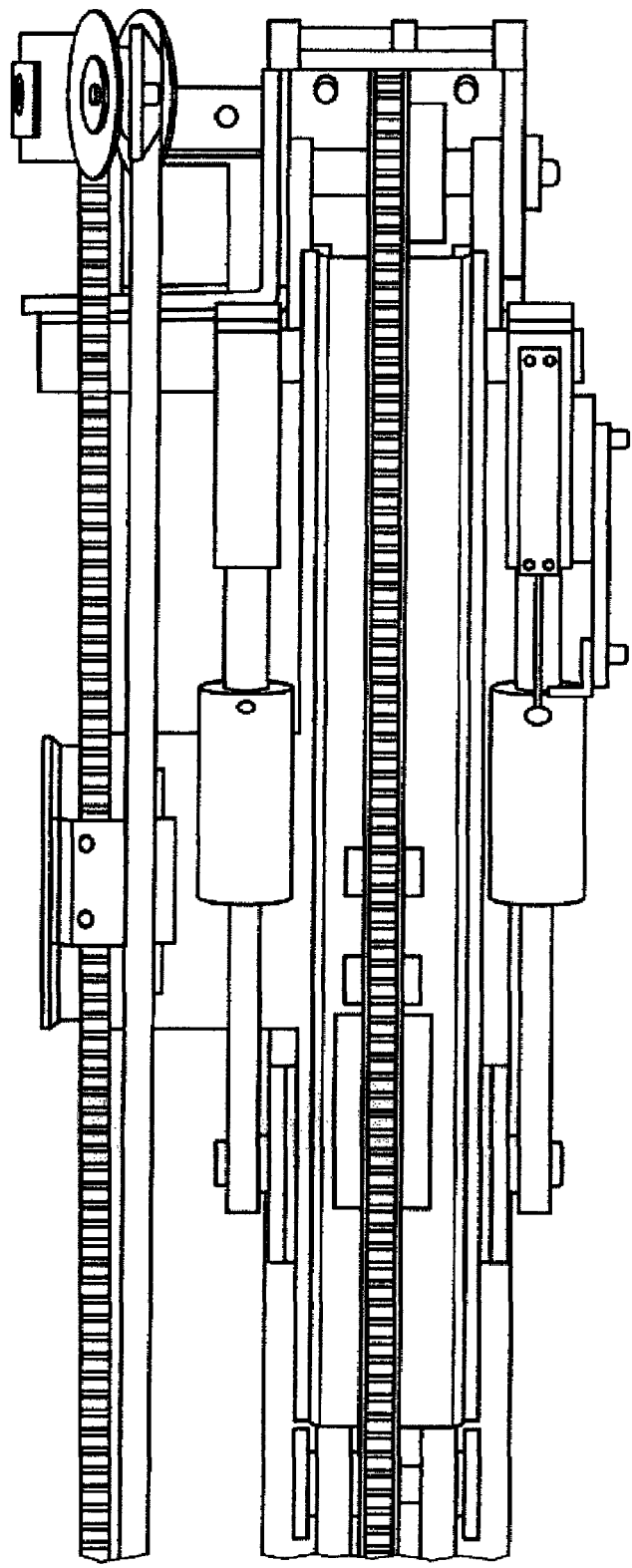
FIG. 18 illustrates a folding out and folding in of a compression unit.

FIG. 18 shows the folding out or folding in of a compression unit used for medical purposes.

If the compression unit is to fold out, it is sufficient to actuate the fold-out button on the control console. The motor starts and moves the lower carriage towards the upper carriage until the opposing plate of the lower carriage reaches the two lower electromagnets or an end switch. During this movement the two rods turn the U-arm lying vertically downwards (examination arm corresponds to upper arm) upwards by 90°.

The two rods are rotatably connected to the lower carriage and rotatably connected to the arm.

The U-arm is supported rotatably on an axis in the upper carriage. The upper carriage is fixed via a permanent magnet to the housing and is fixed in its position.

Figure 19:
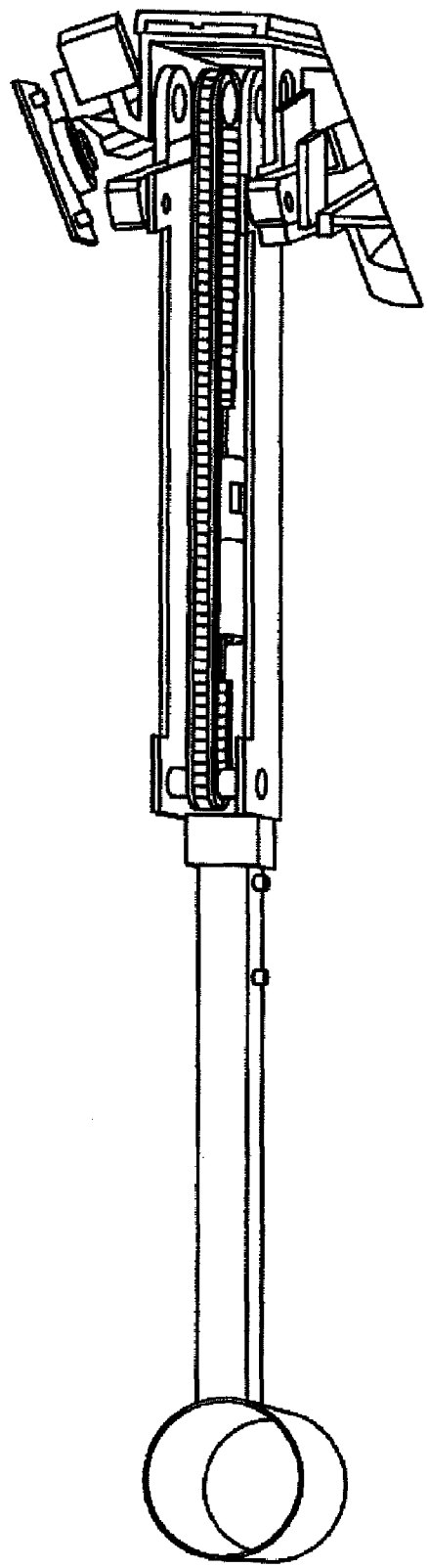
FIG. 19 illustrates one embodiment of an arm.

FIG. 19 shows lower arm or a carbon fiber-reinforced plastic (CFK) arm. The CFK arm with a tube is also folded out during this movement. Folding out is implemented with a chain which is located in the U arm. It is not mandatory for the lower arm to be made of CFK, for example, the lower arm may be made of steel. The tube may, for example, be made of CFK or Polystyrol.

The chain moves on 2 sprockets. Sprocket 1 is firmly connected to the pin in the upper carriage and sprocket 2 is located in the U-arm at the front, where it is connected firmly to the spindle.

Also rigidly connected to this spindle is the adapter piece for the CFK arm.

If the U-arm now rotates through 90° upwards during folding out, the chain on the fixed sprocket moves and simultaneously turns the sprocket 2 with the spindle. As the chain on the fix sprocket moves, the adapter piece and the CFK arm are also turned.

The folding in of the compression arm functions in the reverse order to the folding out.

Figure 20:
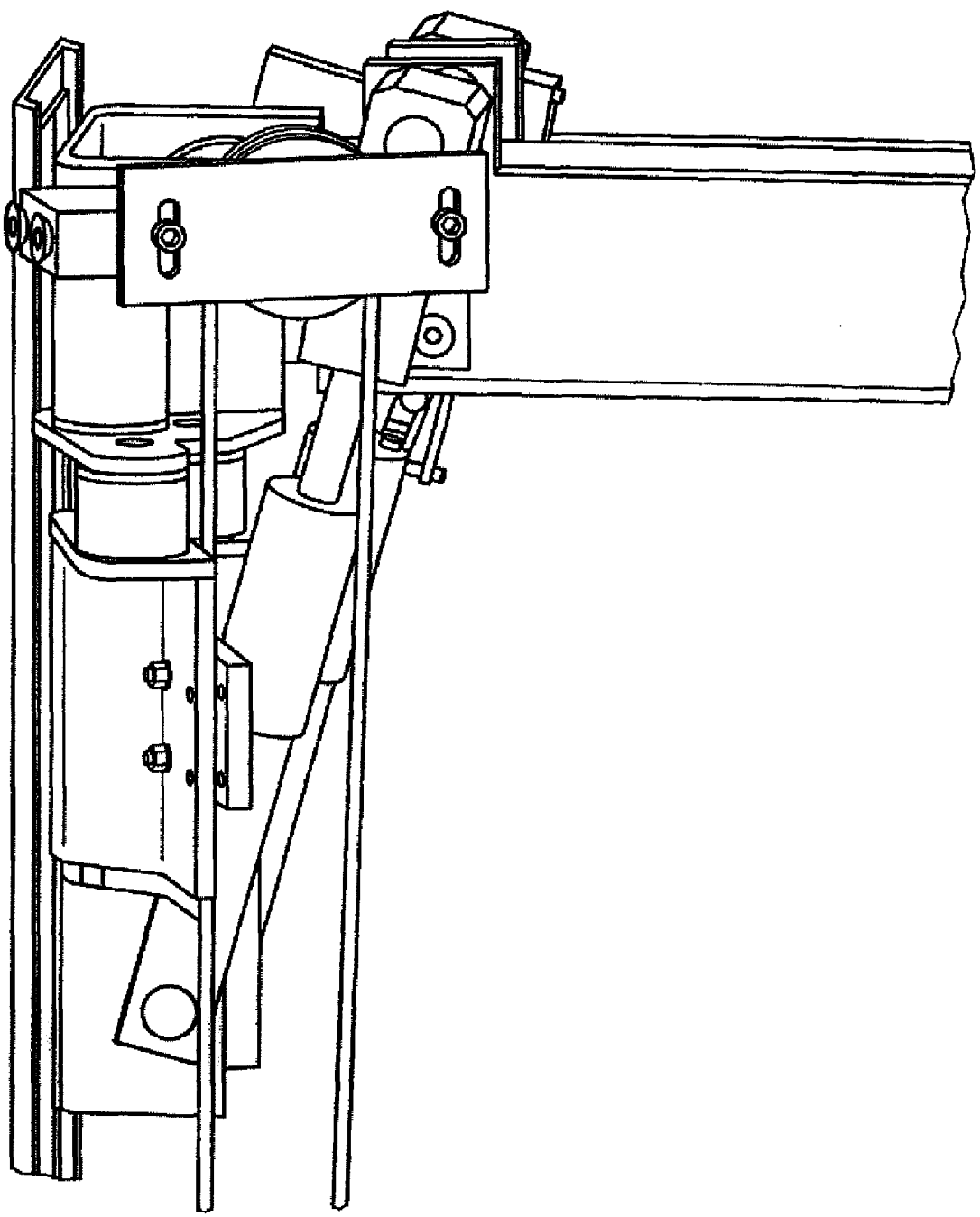
FIG. 20 illustrates a transition from a folding out movement to a compression movement.

FIG. 20 shows the transition from the folding out movement to the compression movement. If the lower carriage has reached its position at the two lower magnets during folding out, then the compression unit is completely folded out. Power is now applied to the two lower magnets. Applying the power makes the two electromagnets magnetic and they hold the lower carriage. The upper and lower carriage are firmly connected to each other. Power is now applied to the permanent magnets. Applying power to the permanent magnets causes the magnet to lose the magnetic effect and to no longer have a connection to the housing.

If the motor is now started, the two connected carriages move downwards and compression may be undertaken.

Figure 21:
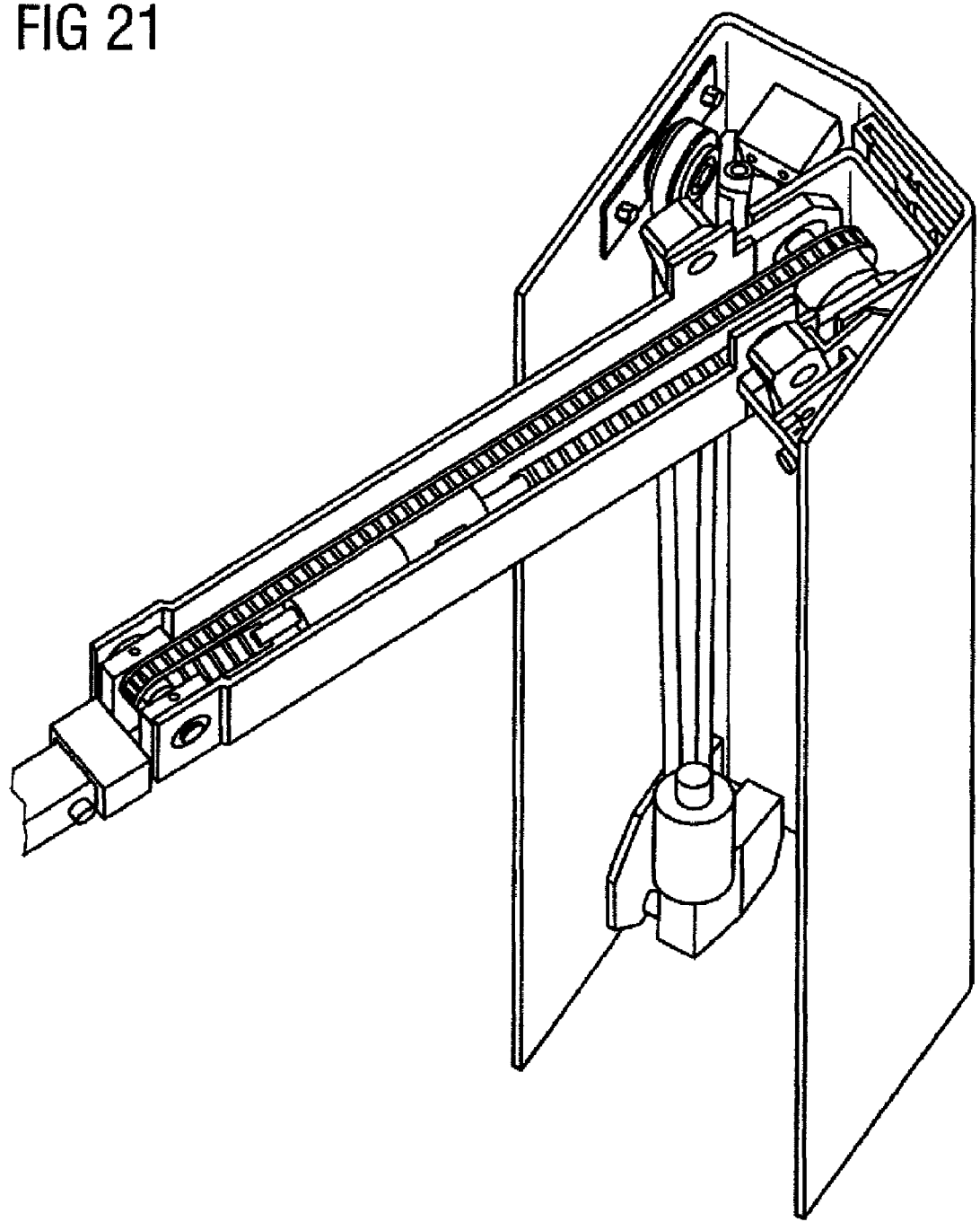
FIG. 21 illustrates cushioning of a compression arm.

FIG. 21 shows a springing of the compression arms during compression.

If a force is acting on the tube during compression, then this force transmits itself to the chain. A spring package which is located in the chain makes possible an extension or elongation of the chain. This extension of the chain enables the U-Arm with the CFK arm to rotate around the pin in the upper carriage thereby provide springing.

Figure 22:
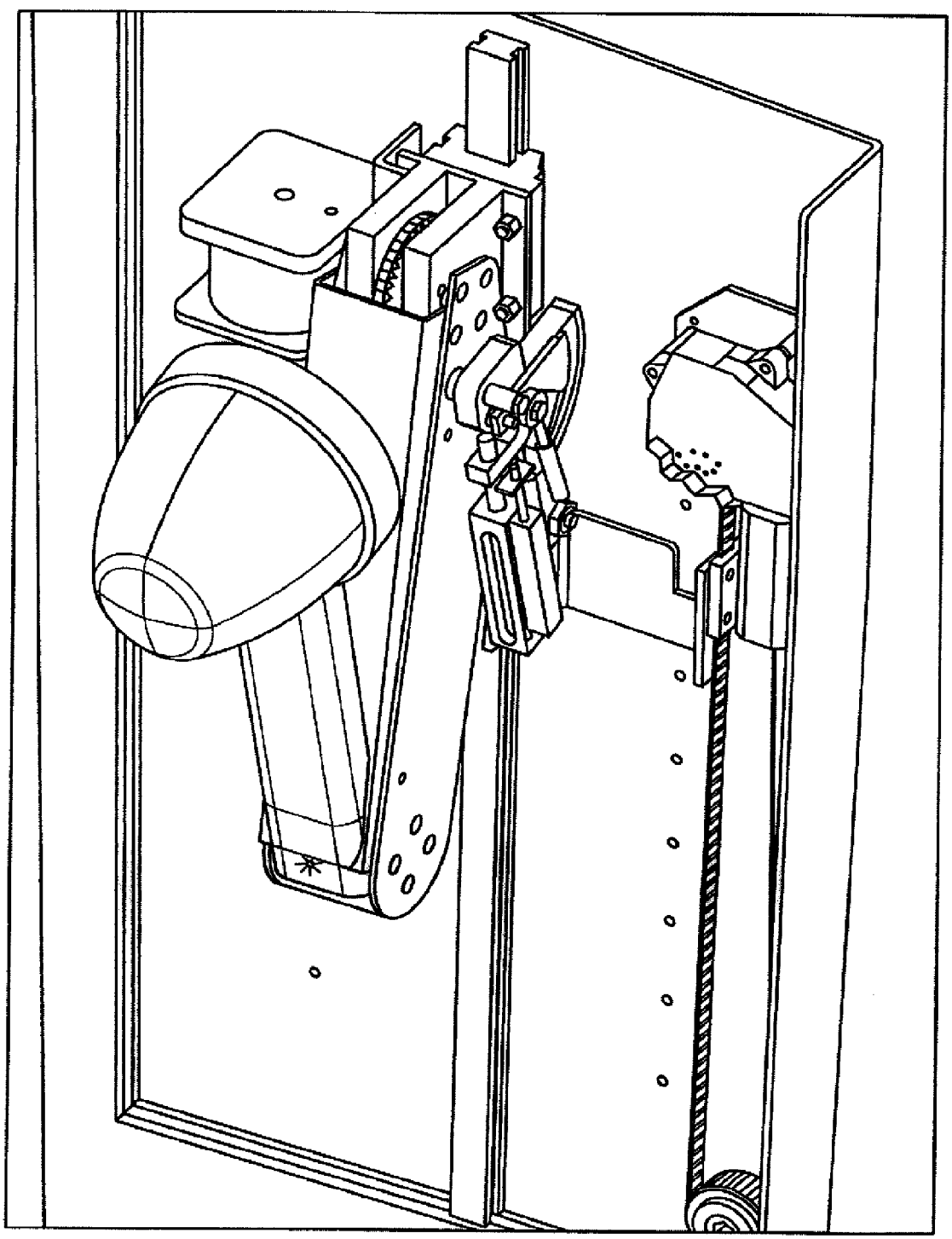
FIG. 22 illustrates one embodiment of a shoulder joint with an arm.
Figure 23:
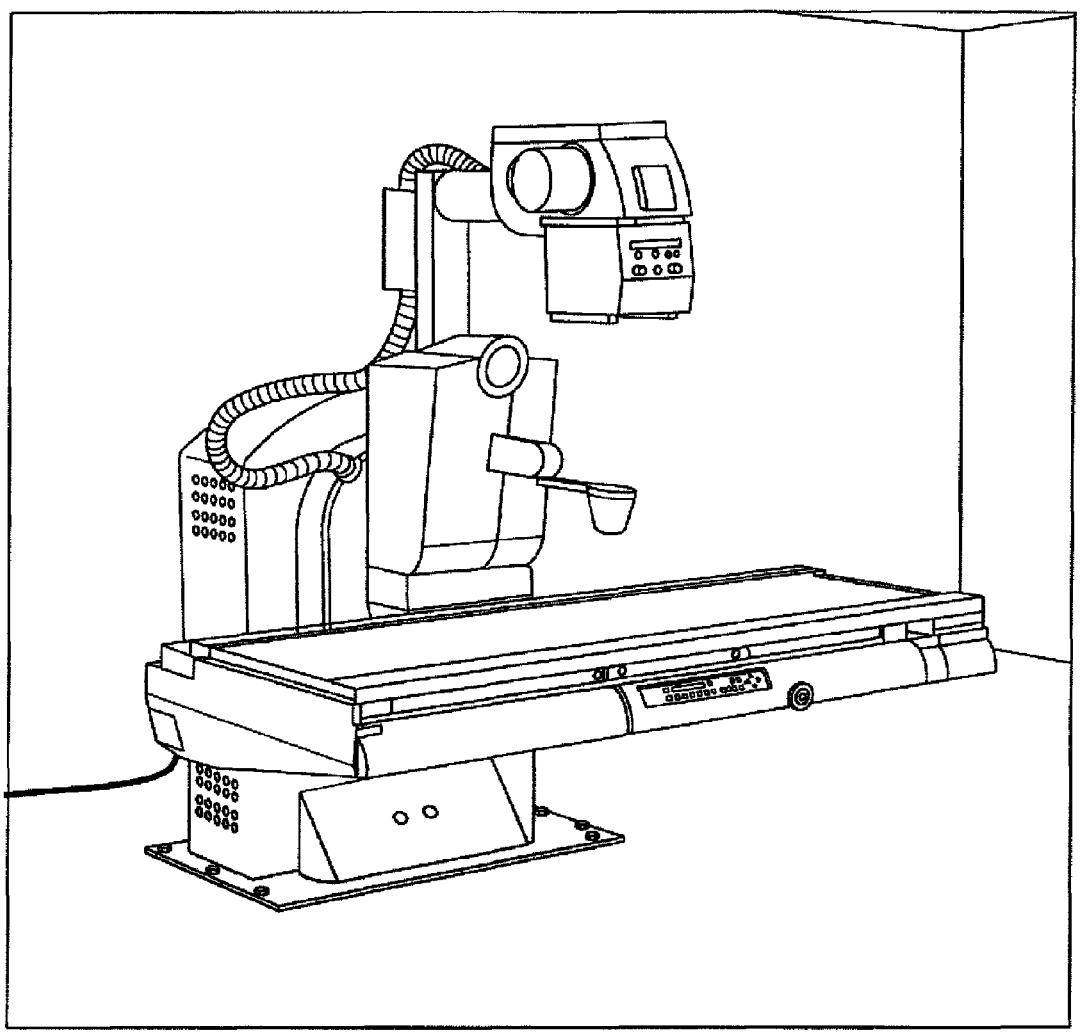
FIG. 23 illustrates one embodiment of a medical device with a shoulder joint.

FIG. 22 shows a schematic presentation of the shoulder joint is shown in. This can—as shown in FIG. 23—be used with an x-ray device for example. The invention is not restricted to medical applications. For example the inventive shoulder joint can be employed in the field of automation or in the field of robotics. A fabric robot can be equipped with an inventive shoulder joint for example to guarantee a flexible folding out and folding in of an arm.

The invention claimed is:

1. A shoulder joint operable to be folded out, the shoulder joint comprising:
    a main support,
    a fold-out arm,
    a first carriage and a second carriage arranged on the main support, and
    a first coupling that is operable to couple the first carriage and the second carriage together,
    wherein the fold-out arm is attached by a pin to the second carriage, and the first carriage is connected to the fold-out arm in such a way that when the first carriage and the second carriage move towards each other, the fold-out arm is folded out by pivoting around the pin, and
    wherein the first coupling is operable to couple the first carriage and the second carriage together when the fold-out arm is folded out, and the first carriage and the second carriage are operable to move jointly in at least one direction when coupled together.

2. The shoulder joint as claimed in claim 1, wherein the first carriage is connected to the fold-out arm by a push rod.

3. The shoulder joint as claimed in claim 1, further comprising: a second coupling that is operable to fix the position of the second carriage on the main support, the second coupling being operable to uncouple the second carriage from the fixed position when the fold-out arm is folded out.

4. The shoulder joint as claimed in claim 3, wherein the second coupling includes at least one permanent magnet, and applying a voltage to the at least one permanent magnet uncouples the second carriage from a fixed position, when the fold-out arm is folded out.

5. The shoulder joint as claimed in claim 1, wherein the first coupling includes at least one electromagnet, and the coupling of the first carriage and the second carriage, when the fold-out arm is folded out, is initiated by applying a voltage to the at least one electromagnet.

6. The shoulder joint as claimed in claim 1, wherein the main support includes a guide rail for the joint movement of the first carriage and the second carriage coupled together.

7. The shoulder joint as claimed in claim 1, wherein the fold-out arm comprises an upper arm and a lower arm, the pin attaches the upper arm to the second carriage, and the lower arm is attached rotatably on a spindle at one end of the upper arm.

8. The shoulder joint as claimed in claim 7, further comprising:
    a first wheel attached to the pin,
    a second wheel attached to the spindle, and
    a mechanical link that links the first wheel and the second wheel to each other such that a rotation of the upper arm around the pin causes a rotation of the second wheel and the lower arm relative to the upper arm, with a bending or stretching movement of the fold-out arm resulting.

9. The shoulder joint as claimed in claim 8, wherein the first wheel and the second wheel are belt wheels, and the mechanical link is a belt passing around the first wheel and the second wheel.

10. The shoulder joint as claimed in claim 9, wherein the mechanical link is operable to yield elastically.

11. The shoulder joint as claimed in claim 10, wherein the mechanical link includes a spring element.

12. The shoulder joint as claimed in claim 8, wherein the first wheel and the second wheel are toothed wheels, and the mechanical link is a chain passing around the first and second wheels.

13. The shoulder joint as claimed in claim 8, wherein the first wheel, the second wheel, and the mechanical link are operable to lock the lower arm and the upper arm relative to each other when the fold-out arm is folded out.

14. The shoulder joint as claimed in claim 13, wherein the first wheel, the second wheel, and the mechanical link are operable to minimize a resulting torque around the spindle when pressure is exerted on the fold-out arm.

15. The shoulder joint as claimed in claim 13, wherein the first wheel, the second wheel, and the mechanical link are operable to eliminate torques around the spindle and the pin.

16. The shoulder joint as claimed in claim 13, wherein the second wheel is an elliptical shaped wheel.

17. The shoulder joint as claimed in claim 8, further comprising a means for estimation of a force exerted on the lower arm, the means for estimation including a spring looped into the mechanical link.

18. The shoulder joint as claimed in claim 1, further comprising: a means for estimation of a force exerted on the fold-out arm.

19. The shoulder joint as claimed in claim 18, wherein the force is measured via a change of a length of a push rod for folding out.

20. The shoulder joint as claimed in claim 1, further comprising: a drive that is operable to move the first carriage and fold out the fold-out arm.

21. The shoulder joint as claimed in claim 1, wherein the main support is a robot.

22. An x-ray system comprising:
an x-ray device, and
a shoulder joint comprising:
   a main support,
   a fold-out arm,
   a first carriage and a second carriage arranged on the main support, and
   a first coupling that is operable to couple the first carriage and the second carriage together,
wherein the fold-out arm is attached by a pin to the second carriage, and the first carriage is connected to the fold-out arm in such a way that when the first carriage and the second carriage move towards each other, the fold-out arm is folded out by pivoting around the pin, and wherein the first coupling is operable to couple the first carriage and the second carriage together when the fold-out arm is folded out, and the first carriage and the second carriage are operable to move jointly in at least one direction when coupled together.

23. The x-ray system as claimed in claim 22, wherein the x-ray device is a fluoroscopy device.

24. A method for folding out a fold-out arm of a shoulder joint, the method comprising:
moving a first carriage toward a second carriage, the first carriage and the second carriage being attached to the fold-out arm in such a way that when the first carriage and the second carriage move towards each other, the fold-out arm pivots around a pin;
coupling the first carriage and the second carriage to each other;
moving the first carriage and the second carriage jointly; and
folding out the fold-out arm by the moving.

25. The method as claimed in claim 24, wherein the second carriage is initially fixed to a main support in a fixed position and after folding out of the fold-out arm, is uncoupled from the fixed position.

26. The method as claimed in claim 24, wherein the fold-out arm includes an upper arm and a lower arm and is operable for a bending or stretching movement with a relative movement of the upper arm and the lower arm such that the bending or stretching movement is implemented automatically via wheels and a mechanical relationship.

* * * * *